United States Patent [19]

Wang et al.

[11] Patent Number: 6,143,818

[45] Date of Patent: Nov. 7, 2000

[54] HOT MELT ADHESIVE BASED ON ETHYLENE-PROPYLENE RUBBER (EPR) AND SEMICRYSTALLINE OLEFINIC POLYMERS

[75] Inventors: Baoyu Wang, Waukesha; Malcolm R. Luebkert, III, Milwaukee, both of Wis.

[73] Assignee: Ato Findley, Inc., Wauwatosa, Wis.

[21] Appl. No.: 09/366,860

[22] Filed: Aug. 4, 1999

[51] Int. Cl.[7] .......................... C09J 123/00; C08L 23/00; C08L 91/06; C08K 5/01

[52] U.S. Cl. .......................... 524/528; 524/504; 524/522; 524/523; 524/524; 524/525; 524/529; 524/533; 524/534; 524/474; 524/487

[58] Field of Search ...................... 524/272, 504, 524/522, 523, 524, 525, 528, 529, 533, 474, 487

[56] References Cited

U.S. PATENT DOCUMENTS

| | | | |
|---|---|---|---|
| 3,868,433 | 2/1975 | Bartz et al. | 525/78 |
| 4,072,735 | 2/1978 | Ardemagni | 524/274 |
| 4,284,541 | 8/1981 | Takeda et al. | 524/504 |
| 4,788,245 | 11/1988 | Anderson | 524/518 |
| 4,803,035 | 2/1989 | Kresge et al. | 264/519 |
| 5,010,119 | 4/1991 | McElrath, Jr. et al. | 523/205 |
| 5,281,651 | 1/1994 | Arjunan et al. | 524/519 |
| 5,391,617 | 2/1995 | Olivier et al. | 525/72 |
| 5,612,141 | 3/1997 | Davis et al. | 428/515 |
| 5,618,883 | 4/1997 | Plamthottam et al. | 525/98 |
| 5,798,175 | 8/1998 | Tynan, Jr. et al. | 428/355 |

FOREIGN PATENT DOCUMENTS

| | | |
|---|---|---|
| 0672737 | 9/1995 | European Pat. Off. . |
| 0714963 | 6/1996 | European Pat. Off. . |
| 0758675 | 2/1997 | European Pat. Off. . |

OTHER PUBLICATIONS

Montell Polyolefins Data Sheet, Adflex KS–357P, Montell North America, Inc., Oct., 1996.
Montell Polyolefins Data Sheet, Adflex KS–084P, Montell North America, Inc., Jan., 1997.
Keltan Survey of EPDM grades, DSM Copolymer, Inc., Nov., 1996.
Keltan 1446A Ultra–low viscosity EPDM, DSM Copolymer, Inc., Aug., 1995.

*Primary Examiner*—Peter A. Szekely
*Attorney, Agent, or Firm*—Andrus, Sceales, Starke & Sawall, LLP

[57] ABSTRACT

An elastomeric-based hot melt adhesive composition having a variety of end uses, particularly in construction and elastic attachment applications on nonwoven disposable articles. The composition includes an elastomeric rubber polymer or a mixture of elastomeric rubber polymers together with a semicrystalline olefinic polymer or a mixture of semicrystalline olefinic polymers, a tackifier resin, a plasticizer, a wax and a stabilizer. The preferred elastomeric rubber polymer is an ethylene-propylene rubber copolymer (EPR) and/or an ethylene-propylene diene monomer rubber terpolymer (EPDM). The hot melt adhesive composition can be applied using common application techniques such as extruding or spraying.

12 Claims, 1 Drawing Sheet

HOT MELT ADHESIVE BASED ON ETHYLENE-PROPYLENE RUBBER (EPR) AND SEMICRYSTALLINE OLEFINIC POLYMERS

FIELD OF INVENTION

This invention relates to novel hot melt adhesive compositions based on ethylene propylene rubber (EPR) and semicrystalline olefinic polymer mixtures. More particularly, this invention relates to adhesive compositions which find utility in manufacturing nonwoven disposable articles such as diapers and feminine care products. The adhesive compositions of the present invention are particularly useful in applications where non-contact patterned coating techniques, such as spiral spray, melt blown and multibeads, are involved.

BACKGROUND OF THE INVENTION

Hot melt adhesives typically exist as solid masses at ambient temperature and can be converted to a flowable liquid by the application of heat. These adhesives are particularly useful in manufacturing of a variety of disposable goods where bonding of various substrates is often necessary. Specific applications include disposable diapers, hospital pads, sanitary napkins, pantyshields, surgical drapes and adult incontinent briefs, collectively known as disposable nonwoven products. Other diversified applications have involved paper products, packaging materials, tapes and labels. In these applications, the hot melt adhesive is heated to its molten state and then applied to a substrate. A second substrate is then immediately brought into contact with and compressed against the first. The adhesive solidifies on cooling to form a strong bond. The major advantage of hot melt adhesive is the lack of a liquid carrier, as would be the case of water or solvent based adhesives, thereby eliminating costly processes associated with liquid carrier removal.

For many applications, hot melt adhesives are often extruded directly onto a substrate in the form of a thin film through a slot die by using piston or gear pump equipment. In these cases, the substrate is brought into intimate contact with a hot die under pressure. The temperature of the die must be maintained well above the melting point of the adhesive, typically in the range of 150 to 200° C. For some applications, particularly for manufacturing nonwoven articles, bonding of delicate and heat sensitive substrates, such as thin gauge polyethylene film, is often involved. Direct contact between the substrate and the die, in these cases, must be avoided to prevent the substrate from burning or distorting. Several application methods have been developed through which a hot melt adhesive can be spray coated with the aid of compressed air onto the substrate from a distance. These techniques include spiral spray, and various forms of melt-blown methods. Direct contact between the coating head and the substrate is thus eliminated. All the coating techniques mentioned above are well known to those skilled in the art and commercial equipment is readily available.

The indirect coating techniques, however, pose stringent requirements on hot melt adhesives. The viscosity of the adhesive must be sufficiently low, usually in the range of 2,000 to 30,000 cP, preferably in the range of 2,000 to 15,000 cP, at the application temperature. Many other physical factors, especially the rheological properties of the adhesive, come into play in determining the sprayability of a hot melt adhesive. The majority of commercial hot melt products do not lend themselves to spray applications. There are no widely accepted theoretical models or guidelines to predict sprayability and it must be determined empirically with application equipment.

Adhesives based on EPR are known in the art. Adhesives based on EPR alone lack sufficient cohesion and thus prior art EPR adhesives often rely on chemical curing to improve cohesive strength and bonding characteristics. Due to the presence of curing agents, these adhesives are not suitable for applications with conventional hot melt coating equipment. The curing agents may cause premature curing or crosslinking of the adhesive inside the coater and render the machine useless. Furthermore, most prior art adhesives are either solvent based or in the form of pre-formed tapes. They can not be considered as hot melt adhesives.

Tynan et al U.S. Pat. No. 5,798,175 discloses pressure sensitive adhesive (PSA) compositions based on a natural rubber or synthetic rubber and an amorphous polyolefin blend comprising EPR, hydrogenated polyisoprene and atactic polypropylene (APP). The adhesives are prepared by compounding the above-mentioned polymers, a compatible tackifier and an organic solvent. The adhesives are thus solvent based and not hot melts.

Davis et al U.S. Pat. No. 5,612,144 and European Patent Application EPO 714963A2 disclose an adhesive tape composition comprising a polymer blend of at least one EPDM rubber, or preferably three different grades of EPDM rubbers in equal amounts, and another polymer selected from polyisoprene, polybutadiene, EPR, and mixtures thereof. The tape composition further includes at least one tackifier and a sulfur curing package. The composition has extremely high viscosity and contains curing agents, and therefore, can not be considered as hot melt adhesive in a conventional sense.

Davis et al European Patent Application 0672737A1 discloses an adhesive tape composition comprising at least one crosslinkable EPDM, one or more compatible tackifiers, a filler, a softener and a curing system for the rubber polymer. The inclusion of curing agents and unusually high viscosity make the composition unsuitable for hot melt applications.

Planthottam et al U.S. Pat. No. 5,618,883 discloses a hot melt pressure sensitive adhesive composition comprising a tackified EPR rubber modified with a copolymer of styrene-ethylene-butylene-styrene block copolymer and/or styrene-ethylene-propylene-styrene block copolymer.

McEbrath Jr. et al U.S. Pat. No. 5,010,119 discloses a curable adhesive composition comprising an elastomer grafted with a $C_3$–$C_{10}$ unsaturated mono- or poly-carboxylic acid or anhydride, a tackifier and a crosslinking agent.

Tape compositions have also been disclosed in U.S. Pat. Nos. 4,379,114, 4,404,056 and 5,242,727. These compositions usually contain an EPDM, or a blend of EPDM with other elastomers including butyl rubber, polyisoprene, halogenated butyl rubber and styrene-butadiene rubber, a tackifier, a curing system and other optional ingredients such as plasticizers and fillers and the like.

It is apparent that all the above prior art adhesive compositions are based on EPDM or EPR rubber, either alone or in combination with other type of rubbers. It is well known to those skilled in the art that all the rubbers noted hereinabove are amorphous polymers. The definition of amorphous polymers and its contrast to crystalline polymers can be found in most polymer chemistry textbooks such as *Polymers, Chemistry and Physics of Modern Materials* by J.M.G. Cowie, 2nd Edition, Blackie Academic and Professionals.

These prior art compositions rely on curing or chemical crosslinking to acquire good cohesive strength and good adhesion characteristics. When uncrosslinked, adhesives based on EPR and EPDM show poor cohesive strength and poor bond strength. The presence of curing agents, and solvent in some prior art compositions, practically made them useless for hot melt applications since the curing agents may cause gelling or crosslinking of the adhesive before they can be applied to a substrate. Such gelling or crosslinking can take place in any component of the coating equipment that involves storage and transport of the molten adhesive mass to the coating head, thereby plugging the equipment and causing severe damage to the coater itself. Further, viscosities of the prior art adhesives are usually very high and beyond the capability of conventional hot melt coating equipment.

SUMMARY OF THE INVENTION

The present invention is directed to a hot melt adhesive composition based on tackified EPR and/or EPDM rubber and at least one semicrystalline olefinic polymer. The compositions of the present invention have overcome the shortcomings of the prior art EPR and EPDM adhesives and provide excellent heat stability, improved cohesive strength, low viscosity, and good adhesion to a variety of substrates and good processibility with conventional coating equipment. In particular, the present invention provides an adhesive composition which is suitable for a variety of spray coating application techniques.

The hot melt adhesive composition of the present invention comprises a mixture of the following ingredients:

a. an elastomeric rubber or a blend of elastomeric rubbers selected from EPR and EPDM rubbers, preferably in the amount of about 5% to 65% by weight, b. at least one semicrystalline olefinic polymer or a blend of semicrystalline olefinic polymers, preferably in the amount of 5% to 40% by weight, c. a compatible tackifier, preferably in the amount of 15% to 75% by weight, d. a plasticizer, preferably in the amount of 0% to 30% by weight, e. about 0% to 30% by weight of a wax, f. about 0% to 2% by weight of a stabilizer or antioxidant and g. optionally up to 50% by weight of a filler, the components of the composition adding up to 100% by weight. The adhesive composition may contain other ingredients which can modify the adhesive properties of the above basic adhesive composition.

DETAILED DESCRIPTION OF THE INVENTION

Figure 1:
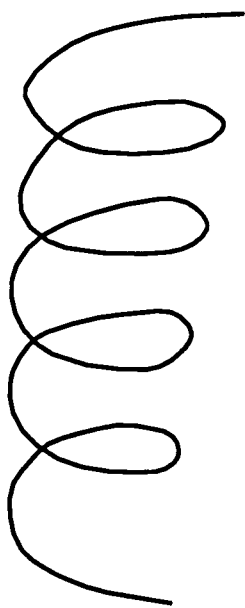
FIG. 1 is a schematic illustration of a desired perfect spiral spray pattern for the adhesive composition of the present invention.

In accordance with the present invention, a hot melt composition is produced, comprising preferably 5% to 65% by weight of EPR, or EPDM, or a mixture thereof, together with about 5% to 40% by weight of a semicrystalline olefinic polymer. The hot melt adhesive composition of the present invention also includes preferably 15% to 70% by weight of tackifying resin, about 0% to 30% by weight of plasticizer, about 0% to 30% by weight of wax and about 0% to 2% by weight of stabilizer or antioxidant. Optionally, the composition also contains up to 50% by weight of a filler.

The term EPR, as used herein, refers to elastomeric copolymers of ethylene and propylene, or such said copolymers modified with functional monomers. The functional monomers include a class of unsaturated organic compounds containing one or more functional groups including carboxylic acid group (—COOH), anhydride group (—CO—O—CO—), hydroxyl group (—OH), ether group (—OR, R is a hydrocarbon radical), primary, secondary and tertiary amine groups and ester group. The content of propylene in the copolymer is in the range of 15% to 70% by weight, preferably between 20% to 45% by weight. The term EPDM refers to elastomeric terpolymers comprising of 15% to 70% by weight, preferably between 20% and 45% by weight, of propylene, from 20% to 80% by weight of ethylene and from 2% to 15% by weight of a diene, for example, 1,4-hexadiene, norbornadiene, ethylidene-norbornene, dicyclopentadiene, butadiene and isoprene. The EPDM used here also includes functionally modified versions of terpolymers containing the functional groups herein mentioned above. EPR and EPDM rubbers are commercially available from Exxon Chemical Company under the Vistalon trade name and from DMS Polymers, Inc. under the Kelton trade name. Functionally modified EPDM containing anhydride groups are sold under the trade name Exxelor by Exxon Chemical Company. As can be seen from what is disclosed above, the preferred EPR or EPDM rubber content is between 5% to 65% by weight. Below 5% there is insufficient cohesiveness while above 65% the viscosity of the composition becomes too high. The composition most preferably contains 15% to 40% by weight of EPR, or EPDM, or a mixture thereof.

The hot melt adhesive composition of the present invention also includes an olefinic semicrystalline polymer component. Suitable semicrystalline olefinic polymers can be obtained either by homo-polymerization of one or by copolymerization of any combination of the unsaturated olefin monomers containing 2 to 20 carbon atoms, which include, but are not limited to, ethylene, propylene, butene-1, butene-2, pentene-1, 4-methyl pentene-1, hexene-1, and octene-1. Suitable polymers can also be prepared by copolymerization of one or more above-mentioned olefinic monomers with other monomers such as dienes, vinyl acetate, vinyl chloride, vinylidiene chloride, acrylic acid, esters of acrylic acid, methacrylic acid, esters of methacrylic acid, vinyl ethers, allyl ethers, acrylamide and its derivatives, styrene, alpha-methylstyrene, vinyl alcohol, and carbon monoxide. Examples of commercially available olefinic semicrystalline polymers include polyethylene, polypropylene, ethylene-propylene copolymers, ethylene-vinyl acetate copolymers, ethylene-acrylic acid copolymers, ethylene-alkyl acrylate or methacrylate copolymers, ethylene-vinyl alcohol copolymers, ethylene-carbon monoxide copolymers, ethylene-alkyl acrylate-(meth)acrylic acid terpolymers, and ethylene-alkyl methacrylate-(meth)acrylic acid terpolymers. It will be recognized that mixtures of any of the above-mentioned olefinic polymers may be used as the base components in the compositions of the present invention. The semicrystalline olefinic polymers function to provide cohesive strength. The preferred semicrystalline polymer amount is from 5% to 40% by weight.

The term "semicrystalline polymer" used herein refers to those polymeric materials that contain both crystalline and amorphous regions in the solid state. In the crystalline region, the molecular chains of the polymers are all arranged in ordered three-dimensional arrays whose structure can be fully characterized by their unit cells, the smallest structural unit used to describe a crystal. The amorphous polymers, in contrast, do not have ordered three-dimensional structures in the solid state. Their molecular chains are arranged in a completely random fashion in space.

Semicrystalline polymers can be easily distinguished from completely amorphous polymers by observing the presence or absence of a melting point ($T_m$) and the associated enthalpy or heat of melting ($\Delta Hm$) derived from the transformation of the crystalline state to liquid state upon heating. All semicrystalline polymers exhibit a melting point, whereas the melting point is absent for amorphous polymers. Amorphous polymers undergo a transition from a glassy solid to a rubbery elastic state in a narrow temperature range around a glass transition temperature Tg. One should not confuse the glass transition temperature Tg with the melting point Tm. Unlike the melting transition of the crystalline materials, the glass transition of amorphous polymers do not have an enthalpy change ($\Delta H$) associated with it.

It should be pointed out that semicrystalline polymers defined above are often referred to as crystalline polymers in the trade. Except for the single crystals prepared in the laboratories on a small scale, perfect crystalline polymers are not encountered in the commercial world and all so-called crystalline polymers, strictly speaking, are semicrystalline. The definition of semicrystalline polymers set forth herein, therefore, embraces the term "crystalline polymers".

Since semicrystalline polymers contain both crystalline and amorphous regions, in addition to melting transition of crystals, they can exhibit a glass transition associated with the amorphous region of the material. The glass transition takes place at a temperature below the melting point.

The melting point Tm, the enthalpy or heat of melting ($\Delta Hm$) and the glass transition temperature (Tg) can be determined by Differential Scanning Calorimetry (DSC). The technique is well known to those skilled in the art and is well described in scientific literature.

The semicrystalline olefinic polymers of the type described above can be purchased from numerous commercial sources, such as, for example, high and low density and linear low density polyethylene from Exxon under the trade name Escorene, polypropylene from Huntsman Corporation under the trade name Rexflex, ethylene-vinyl acetate copolymer from Exxon under the trade name Escorene, ethylene-acrylic acid copolymer from Dow Chemical Co. under the trade name Primacor, ethylene-ethyl acrylate copolymer from Elf Atochem North American Inc. under the trade name Lotryl, ethylene-carbon monoxide copolymer from Planet Polymer Technologies, Inc. under the trade name EnviroPlastic, and ethylene-methyl acrylate-acrylic acid terpolymer from Exxon under the trade name Escor.

The EPR or EPDM rubber and the semicrystalline olefinic polymers employed in the compositions of the present invention can be introduced into the composition preferably as two separate components. Alternatively, the rubber and the semicrystalline polymer can be pre-mixed to form a polymer blend or polymer alloy. The polymer blend can be prepared by mechanical mixing of EPR/EPDM rubber with a semicrystalline polymer through an extruder or Banbury Mixer or the like. It can also be made in situ by step-wise polymerization in a single or a series of parallel reactors. An example of such in situ reactor process is the Catalloy Process employed by Montell North America Inc. This process utilizes multiple gas phase reactors in parallel that allow separate polymerization of different monomer feed stock in each reactor. Each reactor runs independently of the others so each reactor product can be quite dissimilar to what is produced in the other reactors. The product from each reactor can be mixed or blended, creating alloyed polymers directly from the polymerization process. An example of polymer blends or alloys produced in Catalloy Process are Adflex brand (Montell North America, Inc.) thermoplastic olefins (TPOs), which are blends or alloys of EPR and semicrystalline polypropylene.

The tackifying resins which are used in the hot melt adhesives of the present invention are those which extend adhesive properties and improve specific adhesion. As used herein, the term "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall oil rosin and the phenolic modified pentaerythritol ester of rosin;

(c) polyterpene resins having a softening point, as determined by ASTM method E28-58T, of from about 10° C. to 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(d) copolymers and terpolymers of natural terpenes, e.g. styrene/terpene, α-methyl styrene/terpene and vinyl toluene/terpene;

(e) phenolic-modified terpene resins such as, for example, the resin product resulting from the condensation, in an acidic medium, of a terpene and a phenol;

(f) aliphatic and cycloaliphatic petroleum hydrocarbon resins having Ring and Ball softening points of from about 10° C. to 140° C., the latter resins resulting from the polymerization of monomers consisting primarily of aliphatic or cycloaliphatic olefins and diolefins; also included are the hydrogenated aliphatic and cycloaliphatic petroleum hydrocarbon resins; examples of such commercially available resins based on a $C_5$-olefin fraction of this type are Piccotac 95 tackifying resins sold by Hercules Corp. and Eastotac H115R sold by Eastman Chemical Company;

(g) aromatic petroleum hydrocarbons and the hydrogenated derivatives thereof;

(h) aliphatic/aromatic petroleum derived hydrocarbons and the hydrogenated derivatives thereof.

Mixtures of two or more of the above described tackifying resins may be required for some formulations. Although a range of 15–70% by weight tackifying resin may be used, the preferred range is 20% to 50%. Tackifying resins which are useful for the present invention can perhaps include polar tackifying resins, however, the choice of available polar tackifying resins is limited in view of the fact that many of the polar resins appear only partially compatible with the elastomeric rubber polymers and/or semicrystalline olefinic polymers.

As noted above, tackifying resins which are useful within the scope of the present invention comprise about 15% to about 70% by weight. Preferably, the tackifying resins can be selected from any of the nonpolar types, which are commercially available. Preferred resins are aliphatic petroleum hydrocarbon resins examples of which are based on a C5 olefin such as Piccotac 95 available from Hercules Corp. Most preferred are nonpolar tackifying resins which are completely hydrogenated C$_9$ or pure monomer-based hydrocarbon resins with softening points that are in a range of approximately 70° C. to approximately 125° C.

A plasticizer can be present in the composition of the present invention in amounts of about 0% to about 30%, by weight, preferably from about 5% to about 15%, in order to provide desired viscosity control. A suitable plasticizer may be selected from the group which includes the usual plasticizing oils, such as mineral oil, but also olefin oligomers and low molecular weight polymers, as well as vegetable and animal oil and derivatives of such oils. The petroleum derived oils which may be employed are relatively high boiling temperature materials containing only a minor proportion of aromatic hydrocarbons. In this regard, the aromatic hydrocarbons should preferably be less than 30%, and more particularly less than 15%, by weight, of the oil. Preferably, the oil may be totally non-aromatic. The oligomers may be polypropylenes, polybutenes, hydrogenated polyisoprene, hydrogenated butadiene, or the like having average molecular weights between about 350 and about 10,000. Suitable vegetable and animal oils include glycerol esters of the usual fatty acids and polymerization products thereof. The plasticizer that finds usefulness in the present invention can be any number of different plasticizers but the inventors have discovered that a plasticizer which includes mineral oil is particularly useful in the present invention. Other liquid polybutenes having average molecular weights less than 5,000 may also be used. As will be appreciated, plasticizers have typically been employed to lower the viscosity of the overall adhesive composition without substantially decreasing the adhesive strength and/or the service temperature of the adhesive as well as extend the open time of the adhesive.

The waxes which can be used in amounts varying between 0% to 30% by weight, preferably 5% to 15%, in the composition of the present invention are used to reduce the melt viscosity of the hot melt adhesives. These waxes reduce the open time of the composition without effecting the temperature performance. Among the useful waxes are:

(1) low molecular weight, that is, 1000–6000, polyethylene having a hardness value, as determined by ASTM method D-1321, of from about 0.1 to 120 and ASTM softening points of from about 65° C. to 120° C.;

(2) petroleum waxes such as paraffin wax having a melting point of from about 50° C. to 80° C. and microcrystalline wax having a melting point of from about 55° C. to 95° C., the latter melting points being determined by ASTM method D127-60;

(3) atactic polypropylene having a Ring and Ball softening point of from about 120° C. to 160° C.;

(4) synthetic waxes made by polymerizing carbon monoxide and hydrogen such as Fischer-Tropsch wax; and (5) polyolefin waxes. As used herein, the term "polyolefin wax" refers to those polymeric or long-chain entities comprised of olefinic monomer units. These materials are commercially available from Eastman Chemical Co. under the trade name "Epolene." The materials which are preferred for use in the compositions of the present invention have a Ring and Ball softening point of 100° C. to 170° C. As should be understood, each of these wax diluents is solid at room temperature. Other useful substances include hydrogenated animal, fish and vegetable fats and oils such as hydrogenated tallow, lard, soya oil, cottonseed oil, castor oil, menhadin oil, cod liver oil, etc., and which are solid at ambient temperature by virtue of their being hydrogenated, have also been found to be useful with respect to functioning as a wax diluent equivalent. These hydrogenated materials are often referred to in the adhesives industry as "animal or vegetable waxes."

The present invention includes a stabilizer in an amount of from about 0.1% to about 2% by weight, but preferably from about 0.1% to 1%. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. Among the applicable stabilizers are high molecular weight hindered phenols and multifunctional phenols, such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5,-trimethyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-di-tert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6- (4-hydroxyphenoxy)-2,4-bis(n-ocytlthio)-1,3,5-triazine;

2,4,6-tris(4-hydroxy-3,5-di-tert-butyl-phenoxy) -1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

It should be understood that other optional additives may be incorporated into the adhesive composition of the present invention in order to modify particular physical properties. These may include, for example, such materials as colorants, fillers, fluorescent agents, surfactants, etc.

The invention is further illustrated by way of the examples which are set forth below.

The hot melt adhesive composition of the present invention may be formulated using any of the techniques known in the art. A representative example of the prior art mixing procedure involves placing all the components, except the EPR rubber and the semicrystalline olefinic polymer, in a jacketed mixing kettle equipped with a rotor, and thereafter raising the temperature of the mixture to a range from 350 to 400° F. to melt the contents. It should be understood that the precise temperature to be used in this step would depend on the melting points of the particular ingredients. The polymers are subsequently introduced to the kettle under agitation and the mixing is allowed to continue until a consistent and uniform mixture is formed. The contents of the kettle is protected with inert gas such as carbon dioxide and nitrogen during the entire mixing process.

The resulting hot melt adhesives may then be applied to substrates using a variety of coating techniques. Examples include hot melt slot die coating, hot melt wheel coating, hot melt roller coating, melt blown coating and spiral spray coating. In a preferred embodiment, the hot melt adhesive is sprayed onto a substrate using spiral spray technique, which is a preferred technique to produce a filamentary spiral pattern for diaper construction and elastic attachment. In one example, the coater is equipped with a disc-like coating die which has a nozzle tip in the center. The tip is surrounded with a series of inclined orifices for hot air to pass through. The hot melt adhesive is pumped out of the nozzle in the form of a small filament. The filament is then rotated by high-velocity hot air jets coming out of the orifices, thereby producing a helical pattern from a single strand of adhesive. It is not the intent of this invention to provide a full description of spiral spray technique and the details can be found in the literature.

The adhesives composition of the present invention may be used in a number of applications such as, for example, in disposable goods converting, flexible packaging, carton sealing, labeling and other assembly applications. Particularly preferred applications include disposable diaper and feminine sanitary napkin construction, diaper elastic attachment, diaper and feminine napkin core stabilization, diaper backsheet lamination, industrial filter material lamination, surgical gown and surgical drape assembly.

TESTS AND MATERIALS

Viscosity was tested according to ASTM D-3236 Method at 350° F.

Ring & Ball softening point was determined with an automated Herzog unit according to ASTM E-28.

Peel strength was measured in 180° geometry with a Tensile Tester (Instron Model 55R1122) in the controlled atmosphere environment (77° F., 50% relative humidity). Prior to the test, the specimens were equilibrated at the controlled environment for approximately 12 hours to ensure the reproducibility and the accuracy of the data. The test was done with 0.5" wide spiral spray coated specimens at a cross-head speed of 12"/min. The average peel value of six specimens, normalized to g/in unit, was reported as the peel strength.

Creep Resistance test was carried out with laminated specimens described in Examples 1–7. The specimen, cut to 300 mm in length, was stretched out completely and its ends were securely attached to a piece of rigid corrugated paperboard. A length of 200 mm was marked and the elastic strands were cut at the marks. The specimen was then placed in an air-circulating oven at 100° F. Under these conditions, the elastic strands under stress can retreat to a certain distance. The distance between the ends was measured with a ruler after an hour. The ratio of the final length to the initial length, expressed in percentage (%), is defined as the Creep Resistance or Creep Retention.

Figure 2:
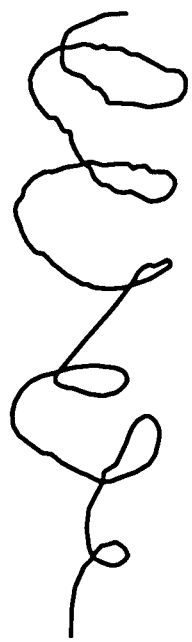
FIG. 2 is a schematic illustration of an undesired poor spiral spray pattern for the adhesive composition of the present invention.

Sprayability was measured empirically on a Meltex CT225 (Nordson) or LH-1 (Acumeter Laboratories) hot melt coater. The coating conditions varied depending on the adhesive sample. A perfect spiral pattern is shown in FIG. 1 and a poor spiral pattern in FIG. 2.

Adflex KS357P is a blend of EPR rubber and semicrystalline propylene polymer with melt flow rate of 25 g/10 min (ASTM D-1238) and a melting point of about 150° C. (DSC), manufactured using Catalloy process by Montell North America Inc.

Adflex KS084P is a blend of EPR rubber and semicrystalline propylene polymer with melt flow rate of 30 g/10 min (ASTM D-1238) and a melting point of about 155° C. (DSC), manufactured with mechanical blending by Montell North America Inc.

Vistalon 703, available from Exxon Chemical Company, is an EPR rubber containing 72% by weight of ethylene comonomer and having a Mooney number of 20 (ASTM D-1646, ML 1+4 at 125° C.).

Vistalon 7800, available from Exxon Chemical Company, is an EPR rubber containing 68% by weight of ethylene comonomer and having a Mooney number of 20 (ASTM D-1646, ML 1+4 at 125° C.).

MDV 91-9, available from Exxon Chemical Company, is an EPR rubber containing 60% by weight of ethylene comonomer and having a Mooney number of 18 (ASTM D-1646, ML 1+4 at 125° C.).

Keltan 1446A, manufactured by DMS Company Inc., is an EPDM containing 58% by weight of ethylene, 7% by weight of ethylidene-norbornene (ENB) and having a Mooney number of 10 (ASTM D-1646, ML 1+4 at 125° C.).

Rexflex W218 is a semicrystalline ethylene-propylene copolymer consisting of 10% by weight of ethylene. It was obtained from Huntsman Corporation.

Exact 4038, a semicrystalline ethylene-butene-1 copolymer made by using a metallocene catalyst, having a melt index (MI) of 125 dg/min, a density of 0.885 g/cc and a butene-1 content of 19% by weight, is acquired from Exxon Chemical Company.

Escorene MV02514, a semicrystalline ethylene-vinyl acetate copolymer having a MI of 2500 dg/min and 14% by weight of vinyl acetate, is obtained from Exxon.

Evatane 18-500, a semicrystalline ethylene-vinyl acetate copolymer having a MI of 500 g/10 min and 18% by weight of vinyl acetate, is purchased from Elf Atochem North America Inc.

Lotryl 10BA175, a semicrystalline ethylene-butyl acrylate copolymer having a MI of 175 g/10 min and 10% by weight of butyl acrylate, is obtained from Elf Atochem North America Inc.

Duraflex PB 8910PC is a semicrystalline copolymer of ethylene and butene-1 containing 5.5% by weight of ethylene. It is available from Montell North America Inc.

Escorez 5400, purchased from Exxon, is a very light color, hydrogenated cycloaliphatic hydrocarbon tackifying resin having a R&B softening point of 103° C. and weight average molecular weight (Mw) of about 440.

Escorez 5600, also purchased from Exxon, is a very light color, aromatic modified hydrogenated cycloaliphatic hydrocarbon tackifying resin having a R&B softening point of 100° C. and weight average molecular weight (Mw) of about 520.

Escorez 1310LC, another tackifying resin purchased from Exxon, is a light color, aliphatic hydrocarbon resin having a R&B softening point of 93° C. and weight average molecular weight (Mw) of about 1350.

Regalite S1100, purchased from Hercules Corporation, is a fully hydrogenated C9 resin having a R&B softening point of about 100° C.

Piccotac 95, available from Hercules, is an aliphatic hydrocarbon tackifying resin having a R&B softening point of about 96° C.

Sylvares 1100, available from Arizona chemical Company, is a polyterpene tackifying resin having a R&B softening point of 100° C.

Sylvares ZT5100, also available from Arizona chemical Company, is a styrenated polyterpene tackifying resin having a R&B softening point of 94° C.

Eastotac H100W and H115R are hydrogenated C5 aliphatic hydrocarbon resins having R&B softening points of 100 and 115° C., respectively. They are purchased from Eastman Chemical Company.

Epolene N-15, available from Eastman Chemical Company, is a propylene derived synthetic wax having a R&B softening point of 163° C. and a Brookfield viscosity of 600 cP at 190° C.

Marcus 300, purchased from Marcus Oil & Chemicals, Inc., is a synthetic polyethylene wax having a melting point of 240° F.

Pennznap 500, purchased from Pennzoil Products Co., is a mineral oil plasticizer.

Irganox 1010 is a hindered phenolic type antioxidant from Ciba Gergy.

EXAMPLES 1–7

Hot melt adhesives of Table I were prepared with the ingredients and mixing procedures described hereinabove. A total of 2000 grams were made each and the mixing was carried out at 375° F. under carbon dioxide atmosphere in a laboratory propeller type mixer which consists of a propeller powered by a motor, a heating mantle, a temperature control unit and a container of about 1 gallon in size. The appropriate amounts of each component calculated according the ratios shown in the table, except the polymers, were added to the container and the temperature of the container was then raised to melt the content. After the ingredients in the container were completely melted, the motor was turned on to start agitation. Subsequently, the polymer component(s) was (were) introduced. The mixing was continued until the polymer became completely dissolved and a uniform mixture was obtained. A pre-blended polymer alloy, either Adflex KS 357P or Adflex KS084P, was employed for preparing Examples of Table I. These polymer alloys, as described hereinabove, consists of both EPR rubber and semicrystalline olefinic polymer, the two essential polymer components of the present invention. The advantage of using polymer alloys is that the EPR rubber and the semicrystalline polymer reside in one product, thereby simplifying raw material handling. The adhesives of Examples 1–7 are useful for a variety of packaging and disposable nonwoven product assembly applications.

Several tests were carried out on Examples 1–7 according to the procedures described above. Specimens for creep resistance and peel strength tests were prepared using Meltex CT225 hot melt coater by laminating three elastic strands (Lycra 740) stretched to 300% between two layers of polypropylene nonwoven fabric of 20 g/m² basis weight, and sprayability was also evaluated in the process. Adhesives were spiral sprayed at 18.6 g/m² coating weight with a 0.25 seconds open time and 1 bar compression at the nip rolls. While the temperature was kept at 400° F. for the heated air used for spraying, the application temperature was adjusted for each adhesive to optimize the spiral pattern. The actual application temperature was shown in Table I for each adhesive.

TABLE I

| | EXAMPLES 1–7 | | | | | | |
|---|---|---|---|---|---|---|---|
| Ingredients | 1 | 2 | 3 | 4 | 5 | 6 | 7 |
| Adflex KS 357P | 20.0 | 22.0 | 20.0 | 15.0 | 18.0 | 21.0 | — |
| Adflex KS 084P | — | — | — | — | — | — | 26.0 |
| Pennznap 500 | 10.0 | 15.0 | 10.0 | 13.0 | 10.0 | 20.0 | 14.0 |
| Epolene N-15 | 15.0 | 10.0 | — | 17.0 | 10.0 | — | — |
| Marcus 300 | — | — | 15.0 | — | 5.0 | — | — |
| Eastotac H100W | 54.0 | 52.0 | 54.0 | — | — | — | — |
| Piccotac 95 | — | — | — | 54.0 | — | — | — |
| Regalite S1100 | — | — | — | — | 56.0 | 58.0 | — |
| Eastotac H115R | — | — | — | — | — | — | 29.7 |
| Escorez 1310 LC | — | — | — | — | — | — | 29.7 |
| Irganox 1010 | 1.0 | 1.0 | 1.0 | 1.0 | 1.0 | 1.0 | 1.0 |
| Viscosity (cPs), 350° F. | 13800 | 11700 | 7025 | 2990 | 4925 | 7300 | 25900 |
| R&B (° F.) | 295 | 293 | 265 | 299 | 291 | 260 | 308 |
| Application temp. (° F.) | 365 | 365 | 350 | 350 | 365 | 365 | 350 |
| Sprayability | Exc | Exc | Exc | Exc | Exc | Exc | Exc |
| Peel strength (g/in) | 866 | 852 | 773 | 826 | 721 | 837 | 798 |
| Creep retention (%) | 91 | 94 | 95 | 95 | 98 | 88 | 86 |

EXAMPLES 8–15

The components of the adhesives in Examples 8–15 were mixed according to the ratios shown in Table II to obtain a total of 250 grams for each by using the same procedure as in Examples 1–7, except a pint-sized container was used. In these examples, the EPR or EPDM rubber and the semicrystalline polymer were added as separate components. The adhesives in Examples 8–15 are useful for a variety of packaging and disposable nonwoven applications. Several tests were carried out according to the methods described above. Specimens for peel test were prepared by laminating two layers of polypropylene nonwoven fabric of 20 g/m² basis weight. Adhesives of these examples were spiral sprayed by using Model LH-1 hot melt coater (Acumeter Laboratories) at 14 g/m² coating weight with a 0.5 seconds open time. The temperature was maintained at 400° F. for the heated air used for spraying and the application temperature, shown in Table II, was adjusted for each adhesive to optimize the spiral pattern. Sprayability was also evaluated during the coating process.

TABLE II

EXAMPLES 8–15

| Ingredients | Amount (%) | | | | | | | |
|---|---|---|---|---|---|---|---|---|
|  | 8 | 9 | 10 | 11 | 12 | 13 | 14 | 15 |
| Keltan 1446A | 20.0 | 12.0 | — | — | — | — | — | — |
| MVD 91-9 | — | — | 15.0 | 10.0 | — | — | — | — |
| Vistalon 7800 | — | — | — | — | 10.0 | — | — | — |
| Vistalon 703 | — | — | — | — | — | 10.0 | 10.0 | 10.0 |
| Pennznap 500 | 15.0 | 15.0 | 15.0 | 20.0 | 5.0 | 20.0 | 20.0 | 20.0 |
| Epolene N-15 | 10.0 | 10.0 | — | — | — | — | — | — |
| Marcus 300 | — | — | 25.0 | — | — | — | — | — |
| Rexflex w218 | — | 8.0 | — | — | — | — | — | — |
| Exact 4038 | — | — | — | 30.0 | — | — | — | — |
| Evatane 18-500 | — | — | — | — | 40.0 | — | — | — |
| Lotryl 10BA175 | — | — | — | — | — | 10.0 | — | — |
| Escorene MV02514 | — | — | — | — | — | — | 10.0 | — |
| PB8910PC | — | — | — | — | — | — | — | 10.0 |
| Eastotac H100W | 54.4 | 54.4 | — | — | — | — | — | — |
| Piccotac 95 | — | — | 44.4 | 44.1 | — | — | — | — |
| Escorez 5600 | — | — | — | — | 44.4 | — | — | — |
| Sylvares ZT 5100 | — | — | — | — | — | 59.0 | — | — |
| Sylvares 1100 | — | — | — | — | — | — | 59.0 | 59.0 |
| Irganox 1010 | 0.60 | 0.60 | 0.60 | 0.95 | 0.60 | 1.0 | 1.0 | 1.0 |
| Viscosity (cPs), 350° F. | 13250 | 10320 | 11310 | 30900 | 4350 | 11500 | 6850 | 4600 |
| R&B (° F.) | 292 | 298 | 244 | 192 | 191 | 192 | 174 | 173 |
| Application Temp. (° F.) | 350 | 375 | 350 | 350 | 350 | 350 | 350 | 350 |
| Sprayability | Exc | Exc | Exc | Exc | Exc | Exc | Exc | Exc |
| Peel strength (g/in) | 694 | 766 | 892 | 788 | 830 | 453 | 481 | 480 |

We claim:

1. A hot melt adhesive composition, consisting essentially of a blend of the following components:
   (a) about 5% to about 65% by weight of an elastomeric rubber or a blend of elastomeric rubbers selected from the group consisting of ethylene-propylene rubber and ethylene-propylene-diene monomer terpolymer rubber;
   (b) about 8% to about 40% by weight of a semi-crystalline olefinic polymer or a blend of semicrystalline olefinic polymers;
   (c) about 15% to about 75% by weight of a tackifying resin;
   (d) about 5% to about 30% by weight of a plasticizer;
   (e) about 0% to about 30% by weight of a wax; and
   (f) about 0.1% to about 2% by weight of a stabilizer;
wherein the components comprise 100% by weight of the composition.

2. The composition of claim 1 wherein the tackifying resin is selected from the group consisting of aliphatic and cycloaliphatic hydrocarbon resins, aromatic and hydrogenated aromatic hydrocarbon resins, and hydrogenated aliphatic and cycloaliphatic hydrocarbon resins, aromatically modified aliphatic and cycloaliphatic resins and their hydrogenated derivatives, polyterpene and styrenated polyterpene resins.

3. The composition of claim 1 wherein the plasticizer is selected from the group consisting of mineral oil and liquid polybutene.

4. The composition of claim 1 wherein the elastomeric rubber comprises a copolymer of ethylene and propylene containing 15% to 70% by weight propylene.

5. The composition of claim 1 wherein the elastomeric rubber comprises a copolymer of ethylene and propylene containing 20% to 45% by weight propylene.

6. The composition of claim 1 wherein the elastomeric rubber comprises a copolymer of ethylene and propylene modified with a functional monomer selected from the group consisting of a carboxylic acid group, an anhydride group, a hydroxyl group, an ether group, a primary amine group, a secondary amine group, a tertiary amine group and an ester group.

7. The composition of claim 1 wherein the elastomeric rubber comprises a terpolymer of from 15% to 70% by weight propylene, from 20% to 80% by weight ethylene, and from 2% to 15% by weight of a diene.

8. The composition of claim 7 wherein said terpolymer contains 20% to 45% by weight of propylene.

9. The composition of claim 7 wherein said diene is selected from the group consisting of 1,4-hexadiene, norbornadiene, ethylidene-norbornene, dicyclopentadiene, butadiene and isoprene.

10. The composition of claim 7 wherein said terpolymer is further modified with a functional monomer selected from the group consisting of a carboxylic acid group, an anhydride group, a hydroxyl group, an ether group, a primary amine group, a secondary amine group, a tertiary amine group and an ester group.

11. The composition of claim 1 wherein the semicrystalline olefinic polymer is selected from the group consisting of polyethylene, polypropylene, ethylene-propylene copolymers, ethylene-vinyl acetate copolymers, ethylene-acrylic acid copolymers, ethylene-alkyl acrylate or methacrylate copolymers, ethylene-vinyl alcohol copolymers, ethylene-carbon monoxide copolymers, ethylene-alkyl acrylate-(meth)acrylic acid terpolymers, ethylene-alkyl methacrylate-(meth)acrylic acid terpolymers, and mixtures thereof.

12. The composition of claim 1 wherein the wax is selected from the group consisting of low molecular weight polyethylene, petroleum waxes, atactic polypropylene, synthetic waxes, and polyolefin waxes.

* * * * *